(12) United States Patent
Sato et al.

(10) Patent No.: US 10,097,762 B2
(45) Date of Patent: Oct. 9, 2018

(54) IMAGING UNIT TO CONTROL DISPLAY STATE OF SHOOTING INFORMATION

(71) Applicant: SONY CORPORATION, Tokyo (JP)

(72) Inventors: Mayuko Sato, Tokyo (JP); Fumikazu Hatanaka, Tokyo (JP); Toshiyuki Kaimi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/307,169

(22) PCT Filed: Mar. 6, 2015

(86) PCT No.: PCT/JP2015/001226
§ 371 (c)(1),
(2) Date: Oct. 27, 2016

(87) PCT Pub. No.: WO2015/170434
PCT Pub. Date: Nov. 12, 2015

(65) Prior Publication Data
US 2017/0054915 A1 Feb. 23, 2017

(30) Foreign Application Priority Data

May 8, 2014 (JP) .................. 2014-097049
May 14, 2014 (JP) .................. 2014-100395

(51) Int. Cl.
*H04N 5/222* (2006.01)
*H04N 5/232* (2006.01)
*H04N 5/225* (2006.01)

(52) U.S. Cl.
CPC ....... *H04N 5/23293* (2013.01); *H04N 5/2251* (2013.01); *H04N 5/2252* (2013.01); *H04N 5/23216* (2013.01); *H04N 5/23222* (2013.01); *H04N 5/23245* (2013.01)

(58) Field of Classification Search
CPC ............. H04N 5/23293; H04N 5/2252; H04N 5/23216
See application file for complete search history.

(56) References Cited

U.S. PATENT DOCUMENTS 5,146,253 A 9/1992 Swayze
5,701,535 A 12/1997 Reibl
(Continued)

FOREIGN PATENT DOCUMENTS

CN 102215344 A 10/2011
CN 103581518 A 2/2014
(Continued)

OTHER PUBLICATIONS

Office Action for JP Patent Application No. 2014-100395, dated Dec. 19, 2017, 15 pages of Office Action and 4 pages of English Translation.
(Continued)

*Primary Examiner* — Sinh Tran
*Assistant Examiner* — Selam Gebriel
(74) *Attorney, Agent, or Firm* — Chip Law Group

(57) ABSTRACT

There is provided an imaging unit, including: a body; a display section provided on the body and pivotable on an axis on the body between a first state in which a display surface is oriented backward of the body and a second state in which the display surface is oriented forward of the body; and a display control section configured, when the display section is in the second state, to cause the display section to display a levelness indicator that indicates an inclination of the body, and to cause the display section to display predetermined shooting information inversely in top-bottom and left-right directions with respect to display directions of the predetermined shooting information on the display section in the first state.

13 Claims, 23 Drawing Sheets

(56) References Cited

U.S. PATENT DOCUMENTS

| | | | |
|---|---|---|---|
| 6,302,597 B1 | 10/2001 | Chang et al. | |
| 2005/0254811 A1 | 11/2005 | Taneoka | |
| 2009/0096910 A1* | 4/2009 | Yasuda | H04N 5/23293 348/333.01 |
| 2011/0249165 A1 | 10/2011 | Churei | |
| 2013/0027570 A1 | 1/2013 | Kinoshita | |
| 2013/0120635 A1 | 5/2013 | Kim et al. | |
| 2013/0321691 A1* | 12/2013 | Naito | G03B 13/36 348/345 |
| 2014/0033137 A1* | 1/2014 | Song | G06F 3/017 715/863 |
| 2014/0300791 A1* | 10/2014 | Shirono | H04N 5/23293 348/333.06 |

FOREIGN PATENT DOCUMENTS

| | | |
|---|---|---|
| DE | 29510157 U1 | 8/1995 |
| EP | 1330119 A1 | 7/2003 |
| JP | 60-121431 A | 6/1985 |
| JP | 09-244102 A | 9/1997 |
| JP | 09-244102 A1 | 9/1997 |
| JP | 2001-268402 A | 9/2001 |
| JP | 2005-328204 A | 11/2005 |
| JP | 2008-053925 A | 3/2008 |
| JP | 2011-232741 A | 11/2011 |
| JP | 2012-039452 A | 2/2012 |
| JP | 2013-012978 A | 1/2013 |
| JP | 2013-114075 A | 6/2013 |
| JP | 2014-022977 A | 2/2014 |
| KR | 10-2011-0113150 A | 10/2011 |
| WO | 2013/161583 A1 | 10/2013 |

OTHER PUBLICATIONS

Office Action for JP Patent Application No. 2014-100395, dated Sep. 5, 2017, 22 pages of Office Action and 23 pages of English Translation.

* cited by examiner

[Fig. 1]
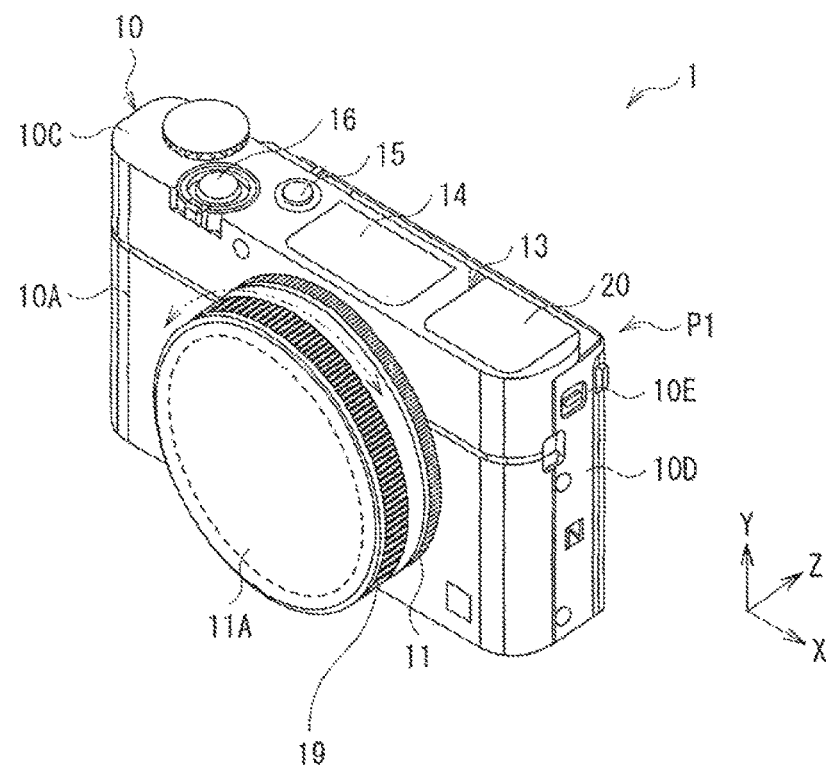

[Fig. 2]
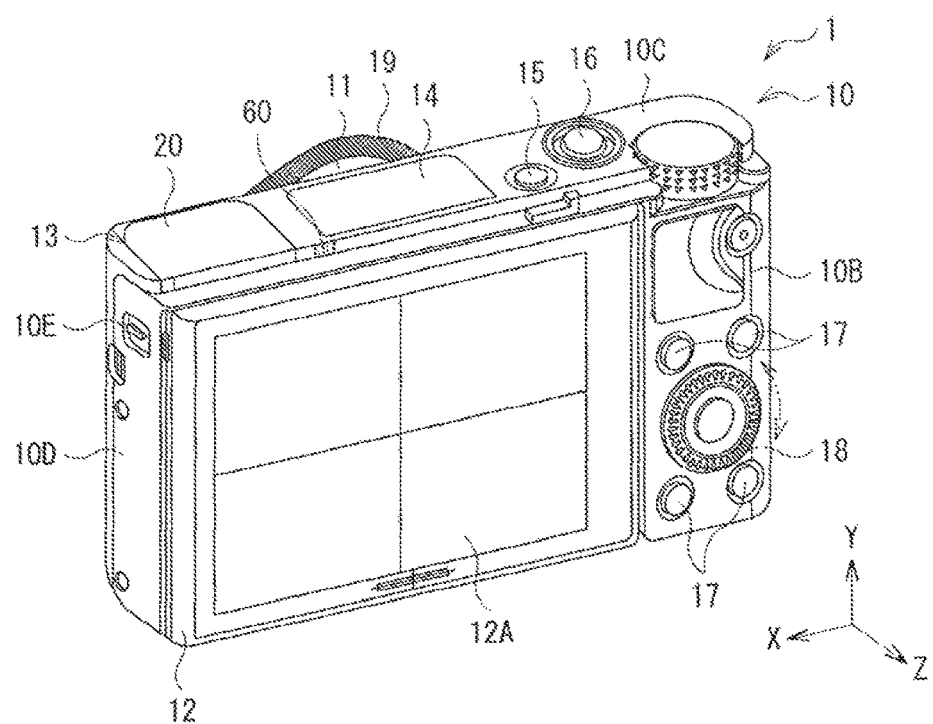

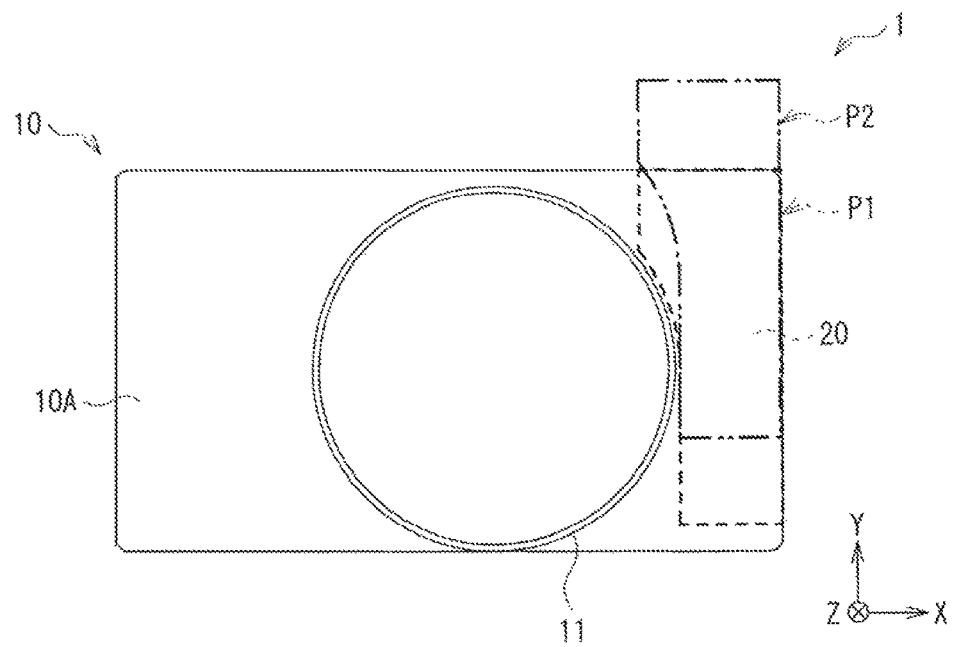

[Fig. 4]
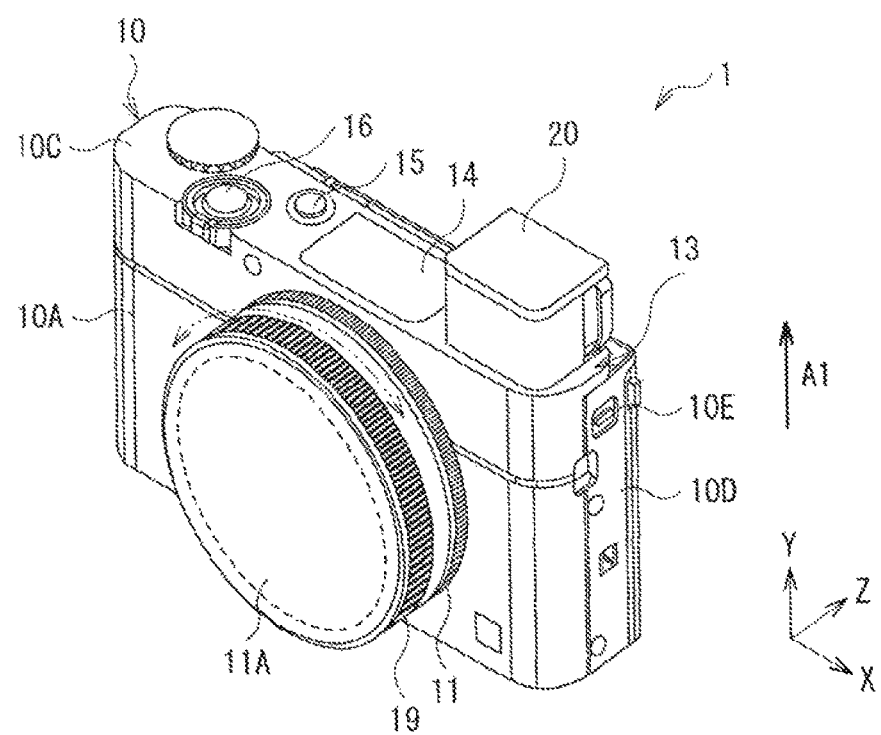

[Fig. 5]
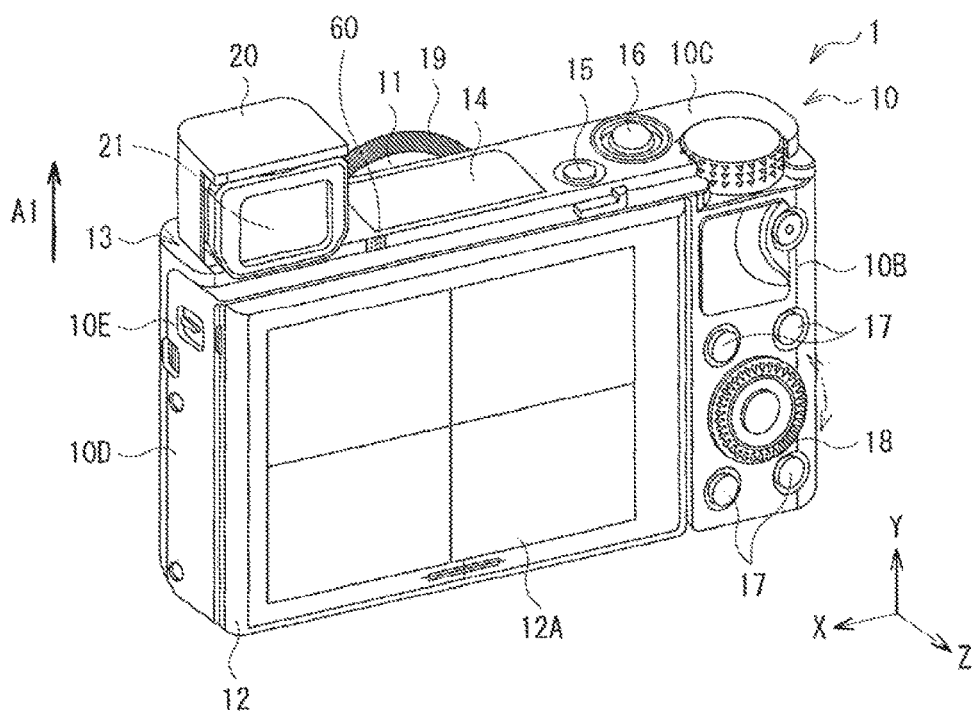

[Fig. 6]
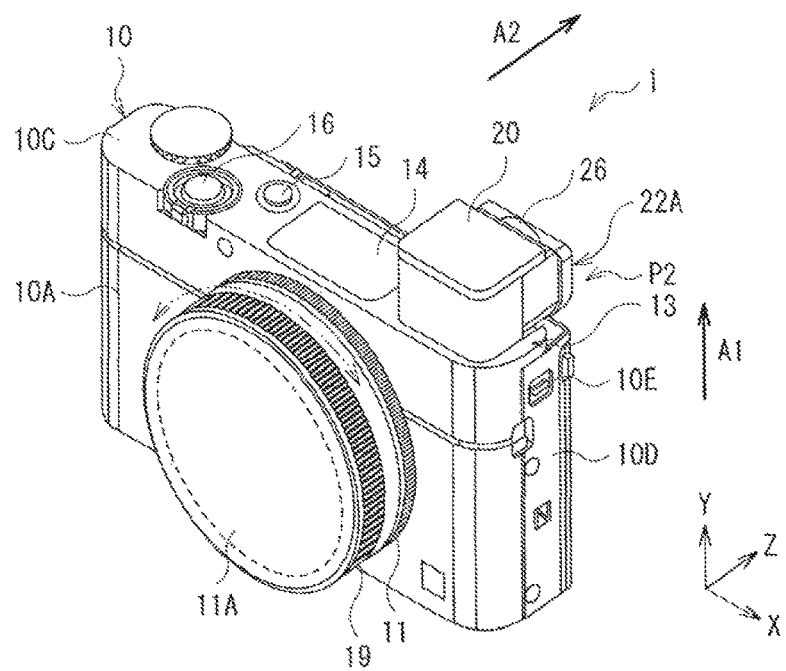

[Fig. 7]
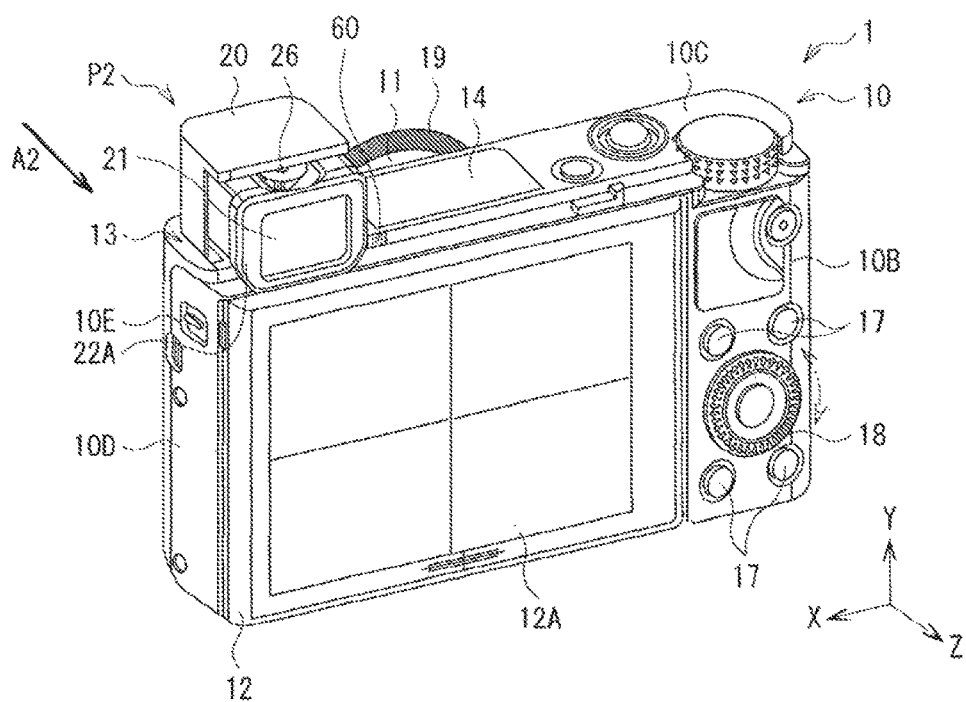

[Fig. 8]
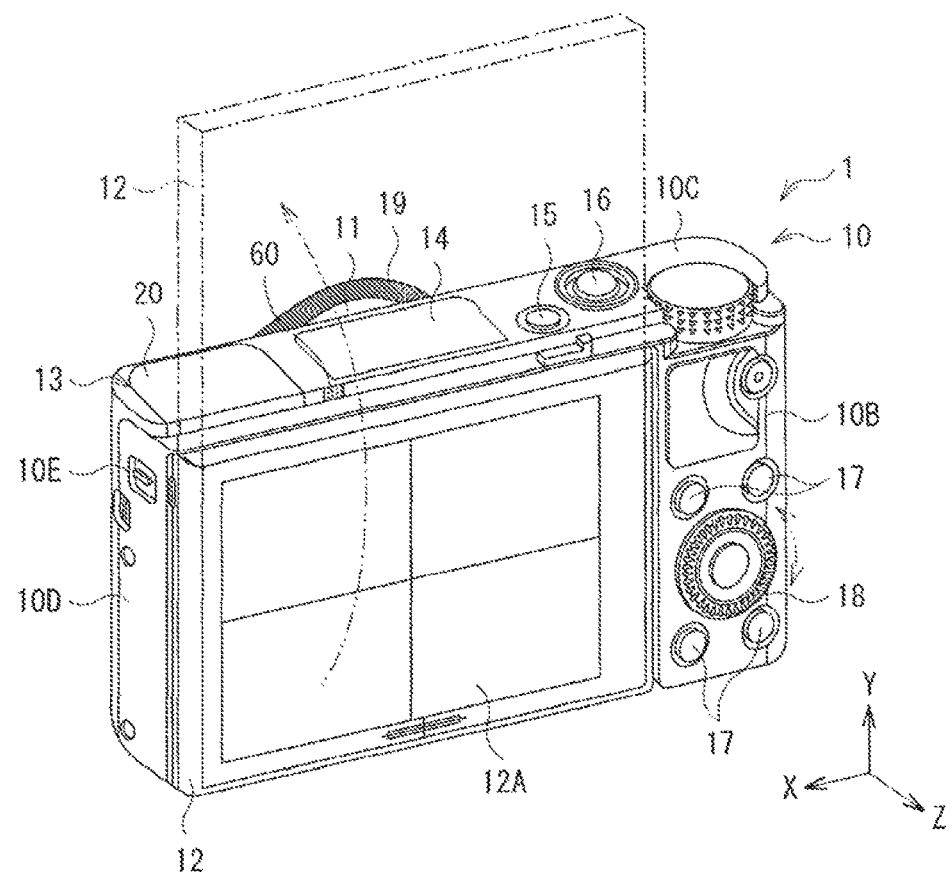

[Fig. 9]
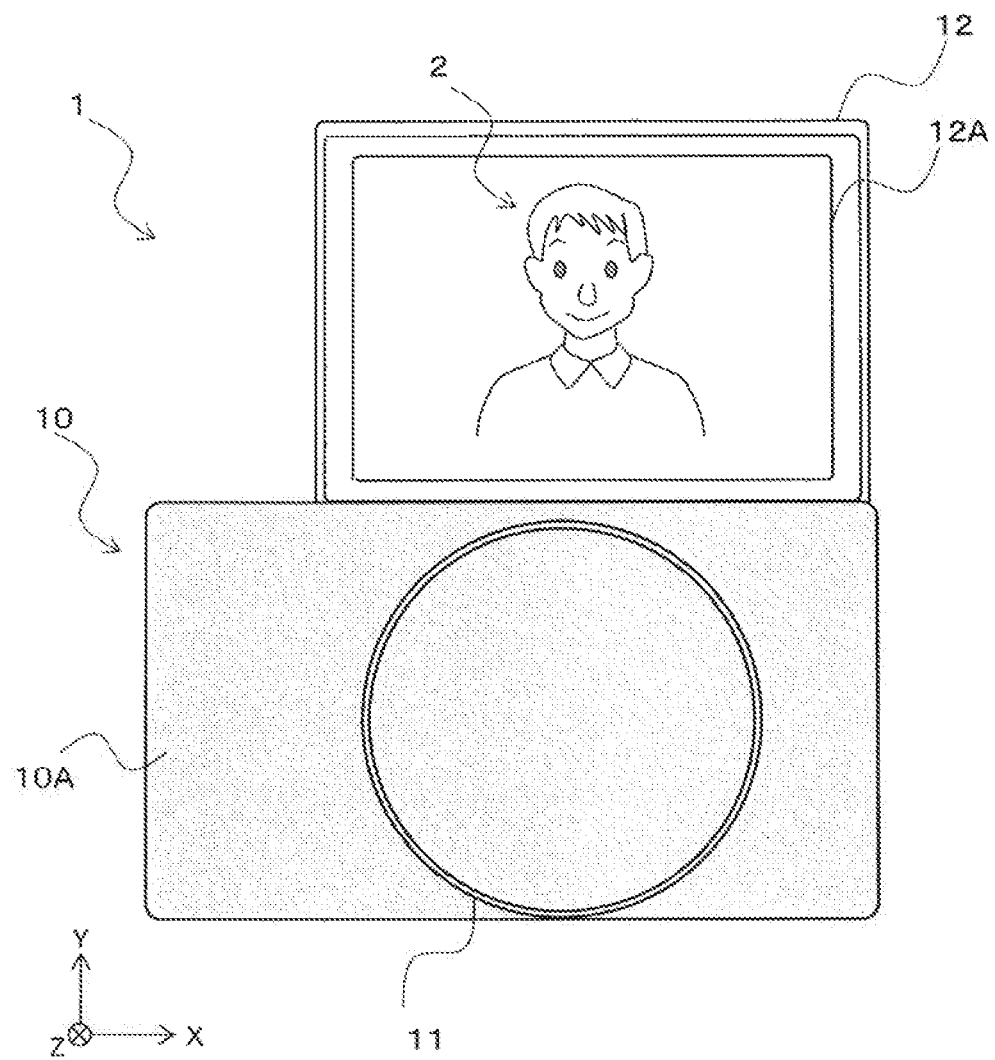

[ Fig. 10 ]
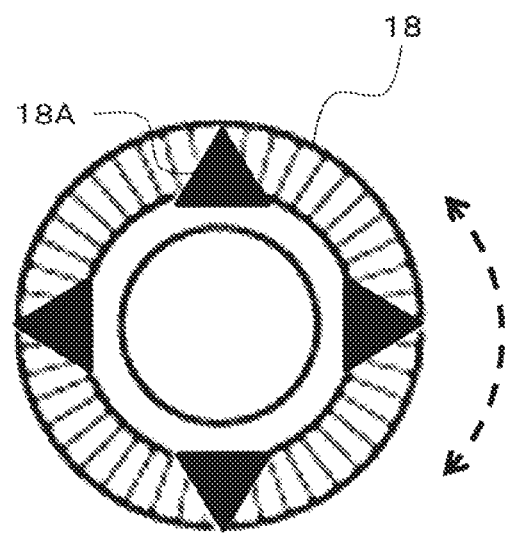

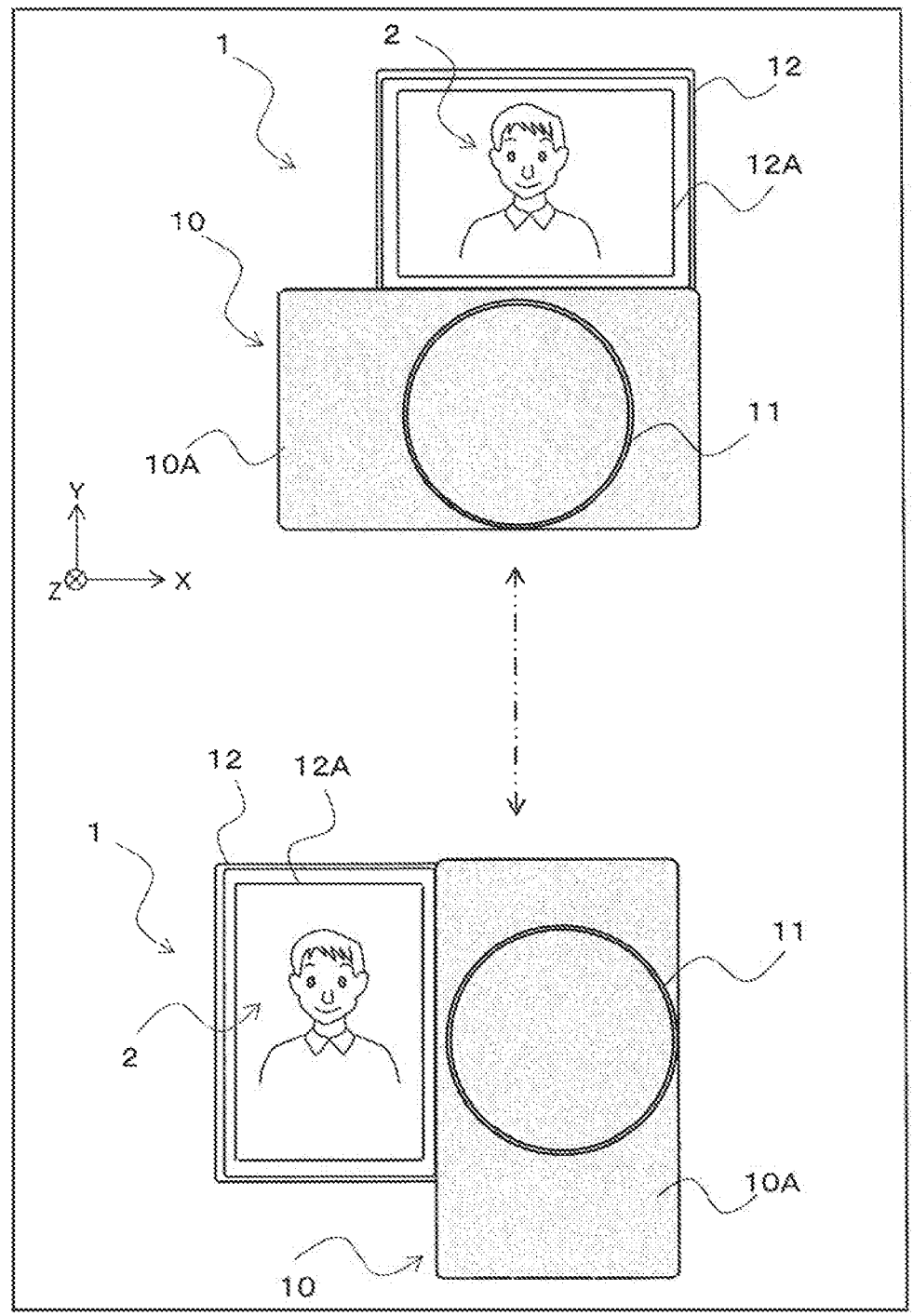
[Fig. 11]

[Fig. 12]
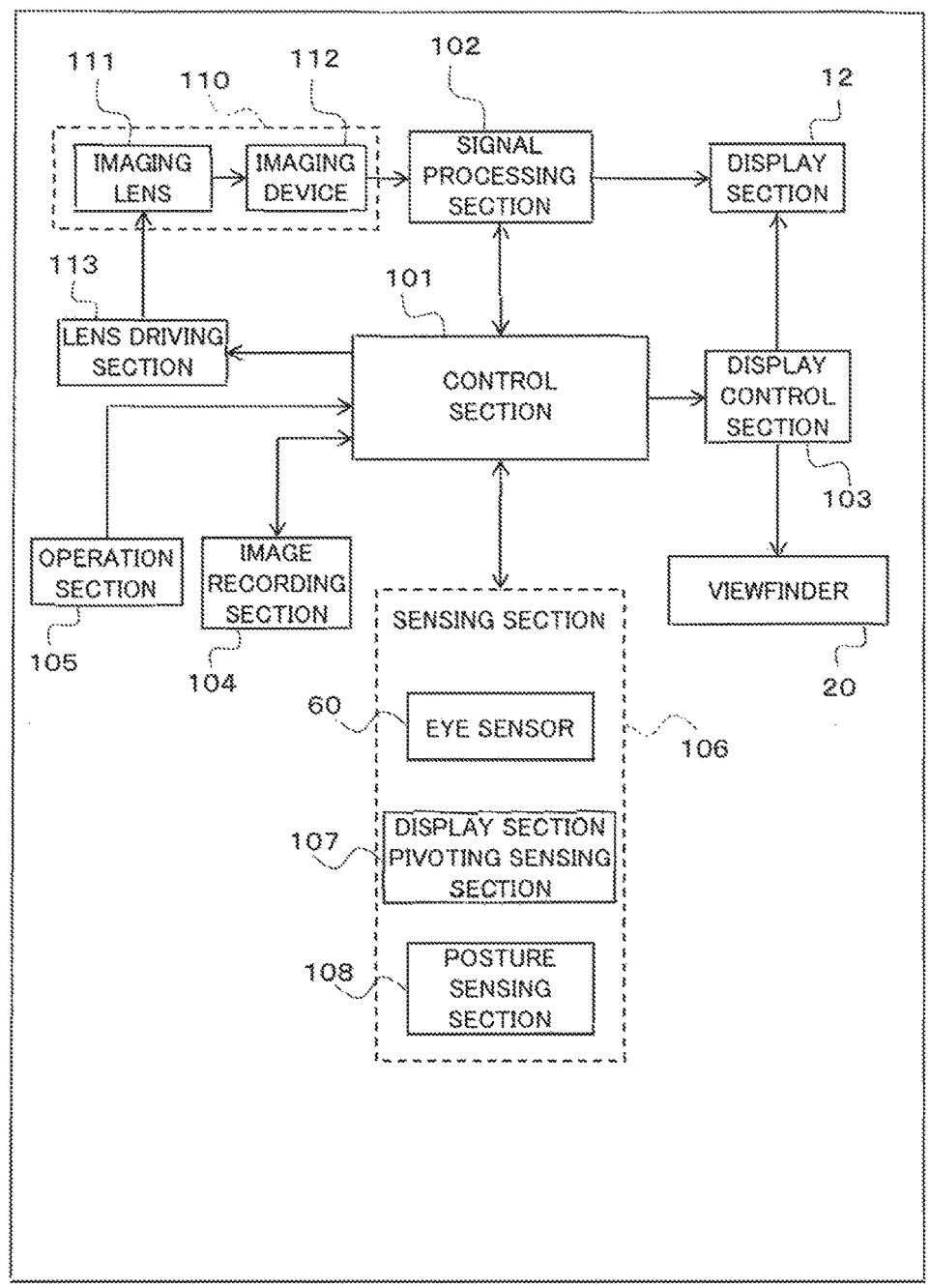

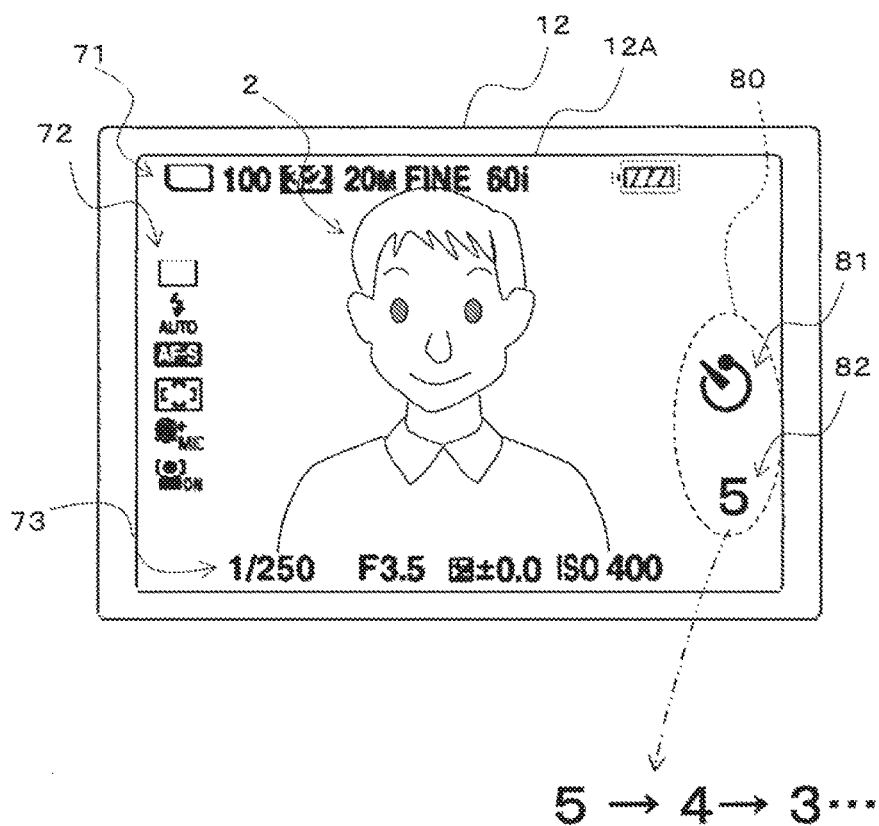
[Fig. 13]

[Fig. 14]
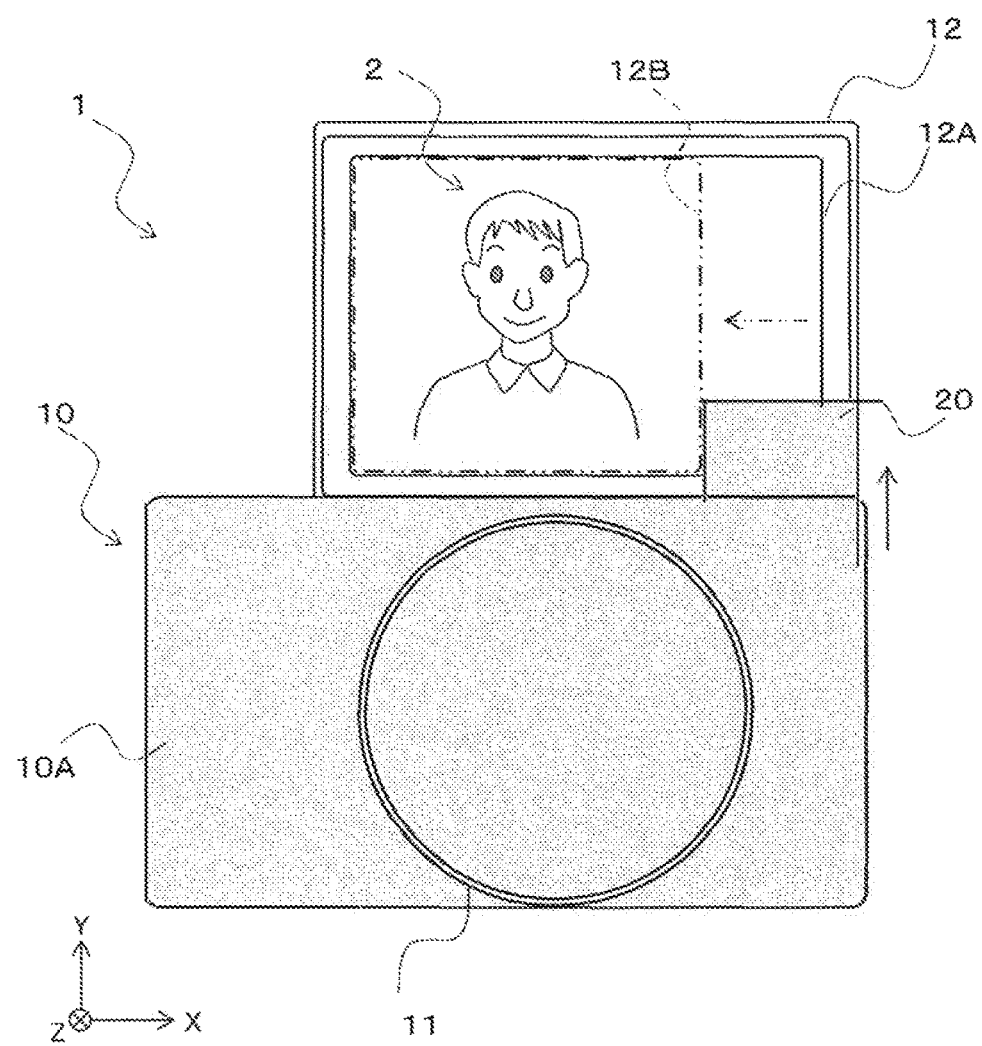

[Fig. 15]
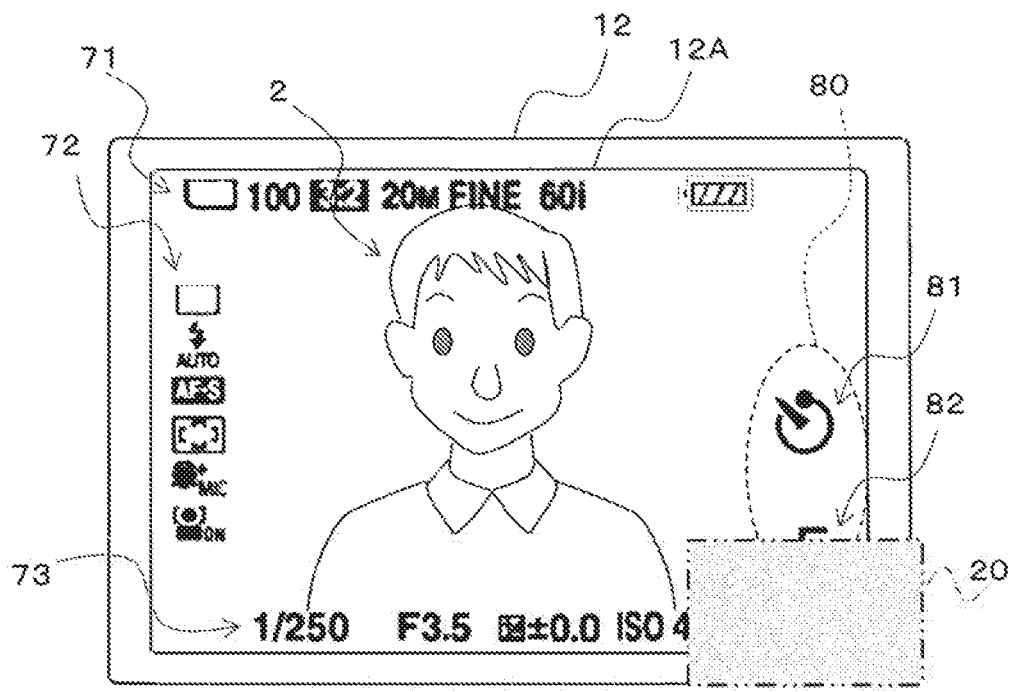
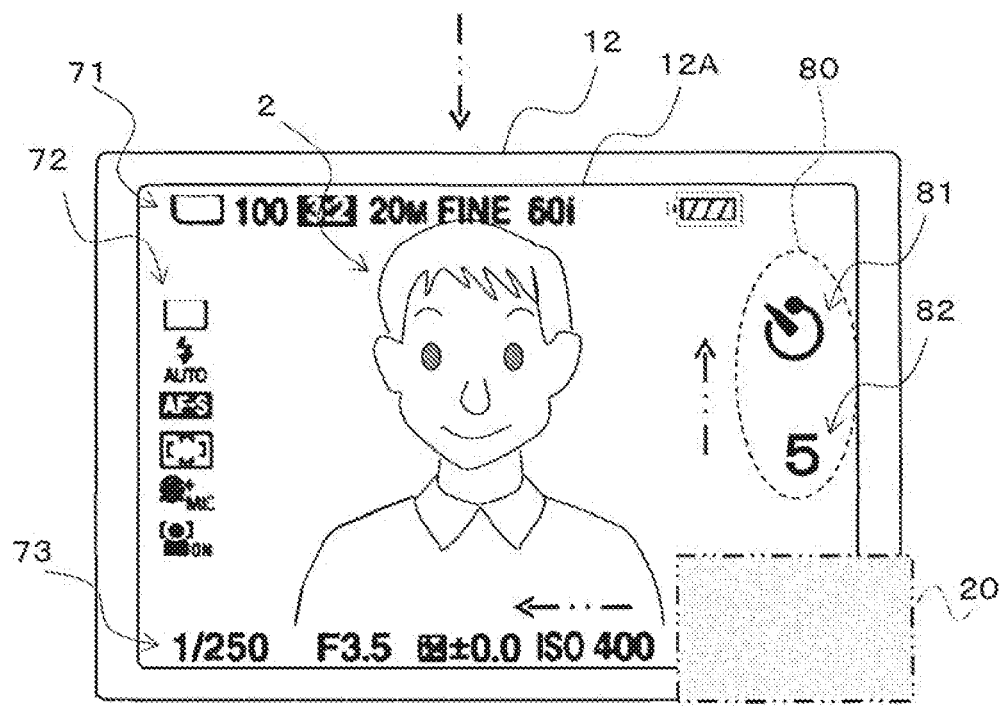

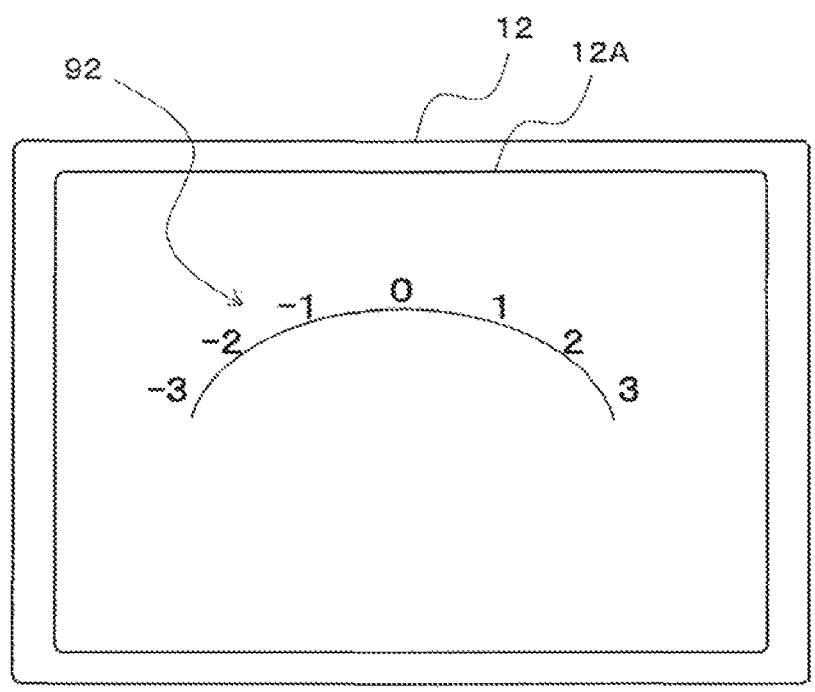
[Fig. 16]

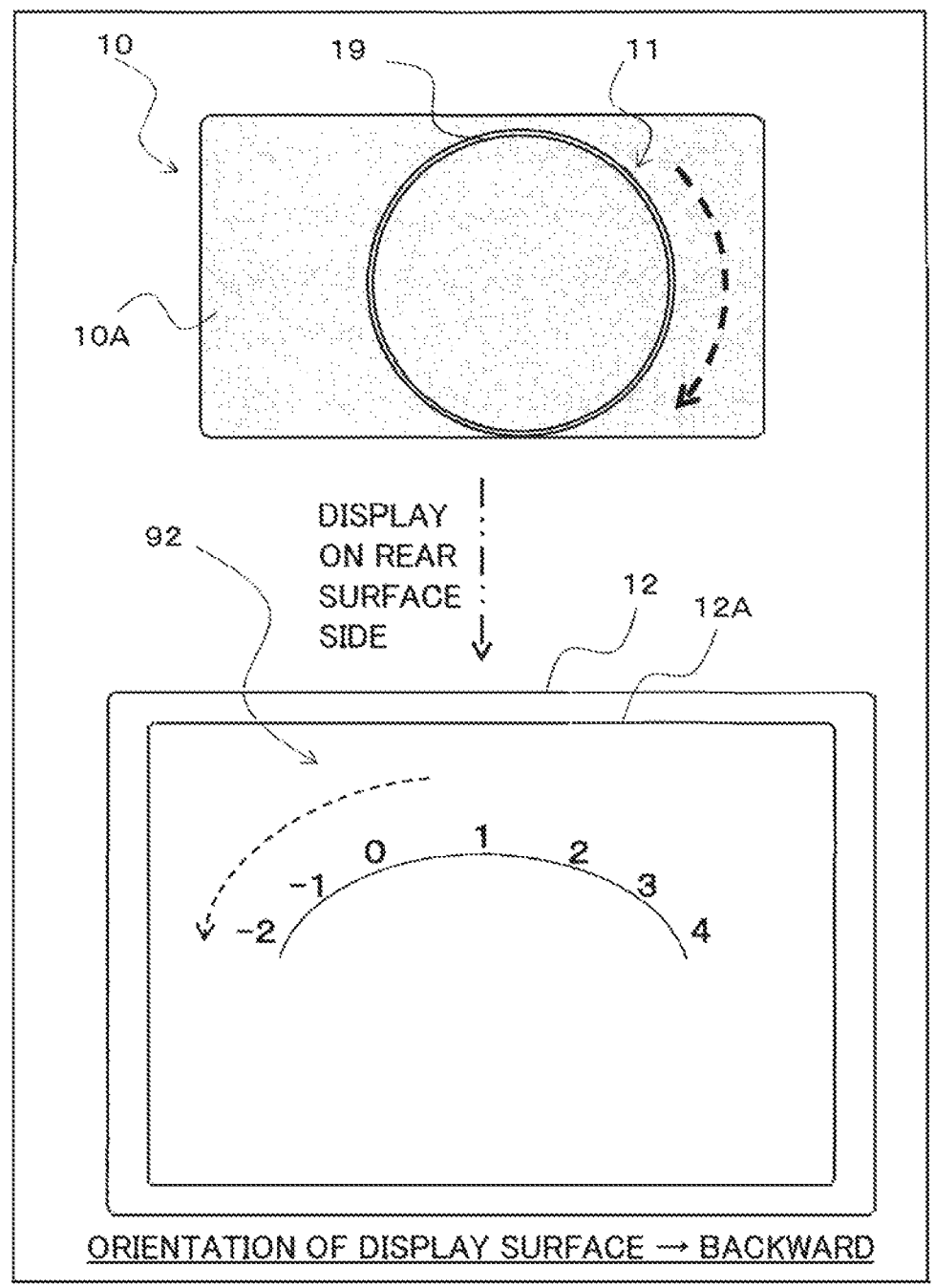

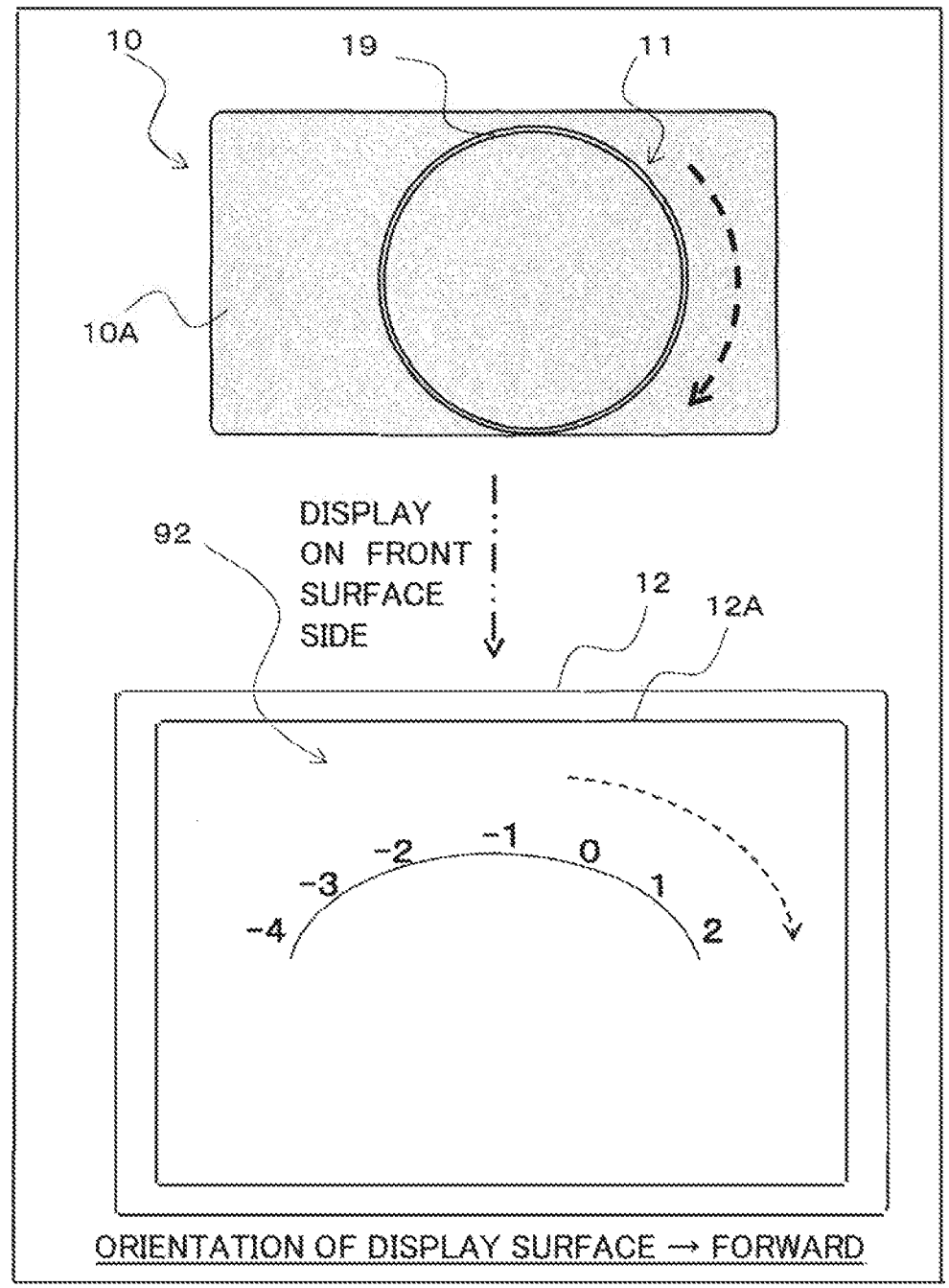
[ Fig. 18 ]

[Fig. 19]
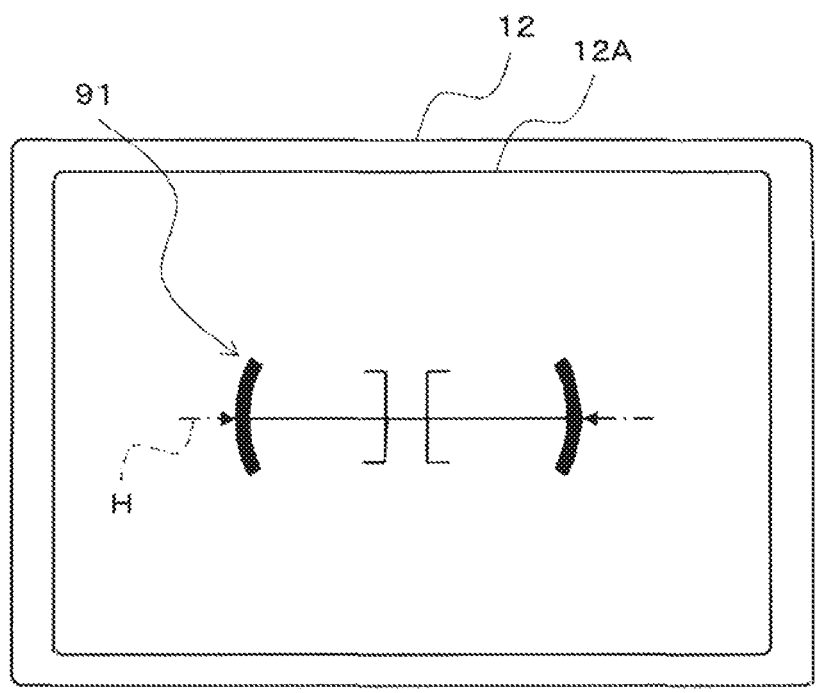

[Fig. 20]
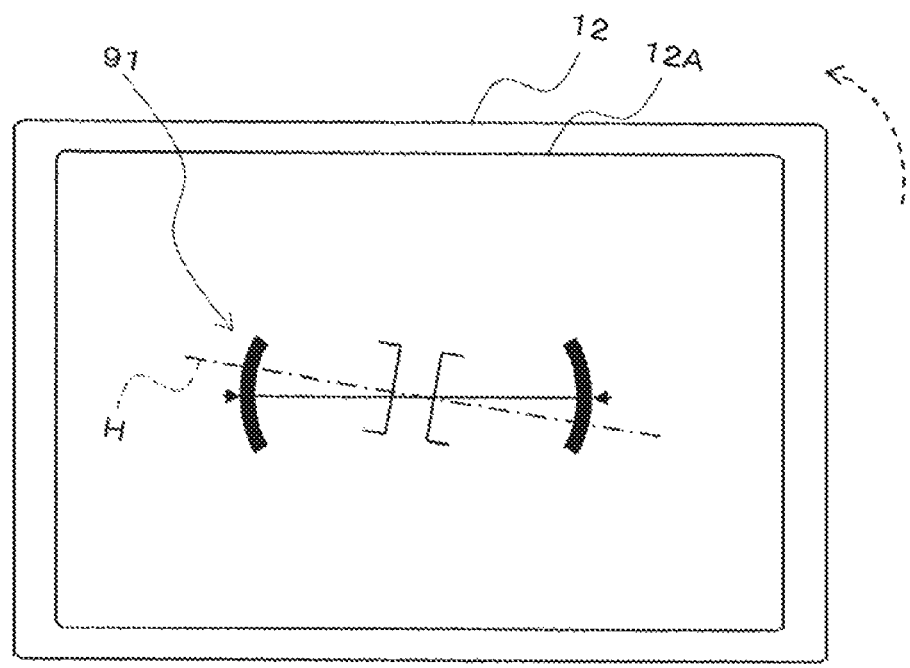

[Fig. 21]
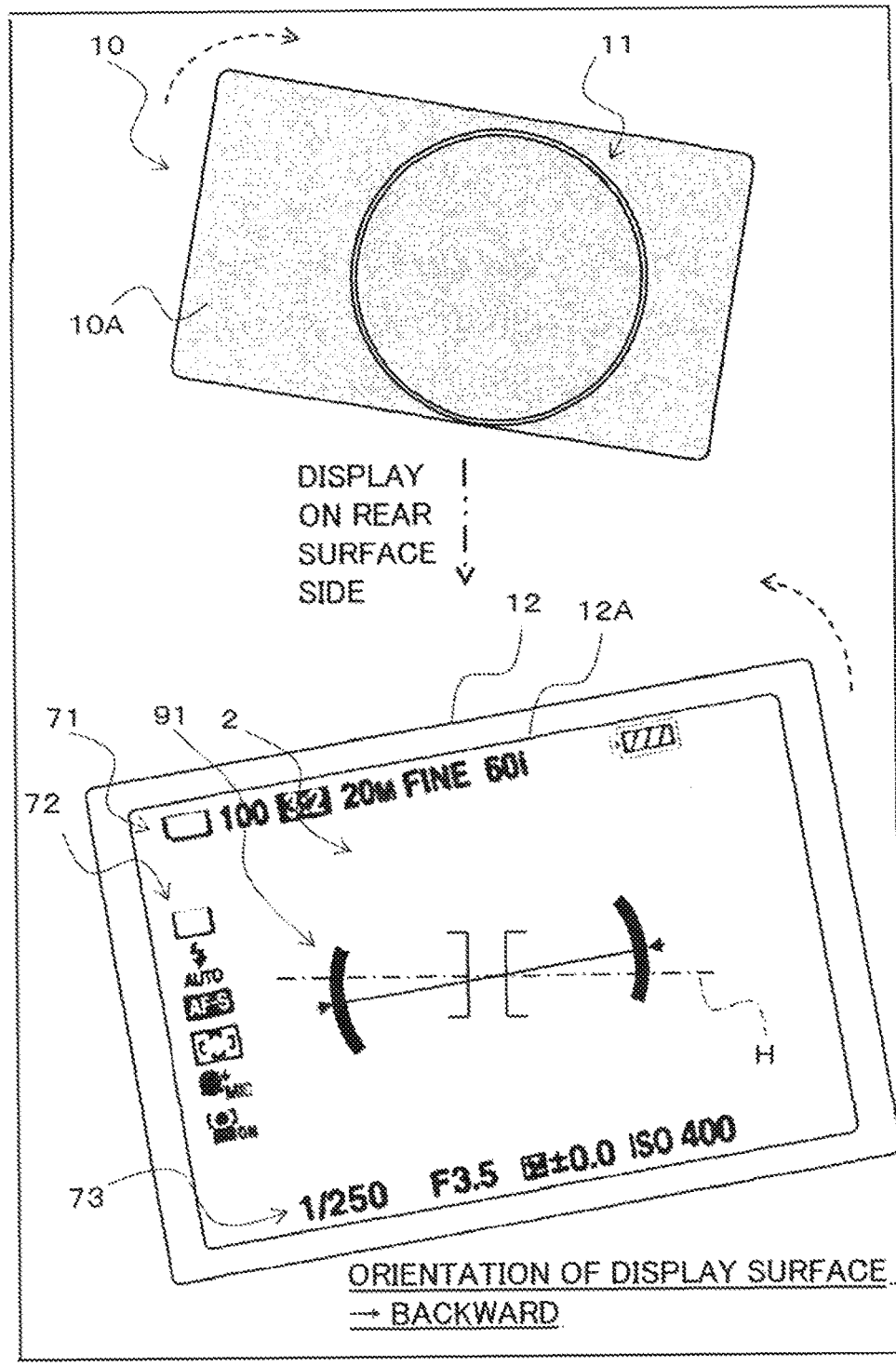

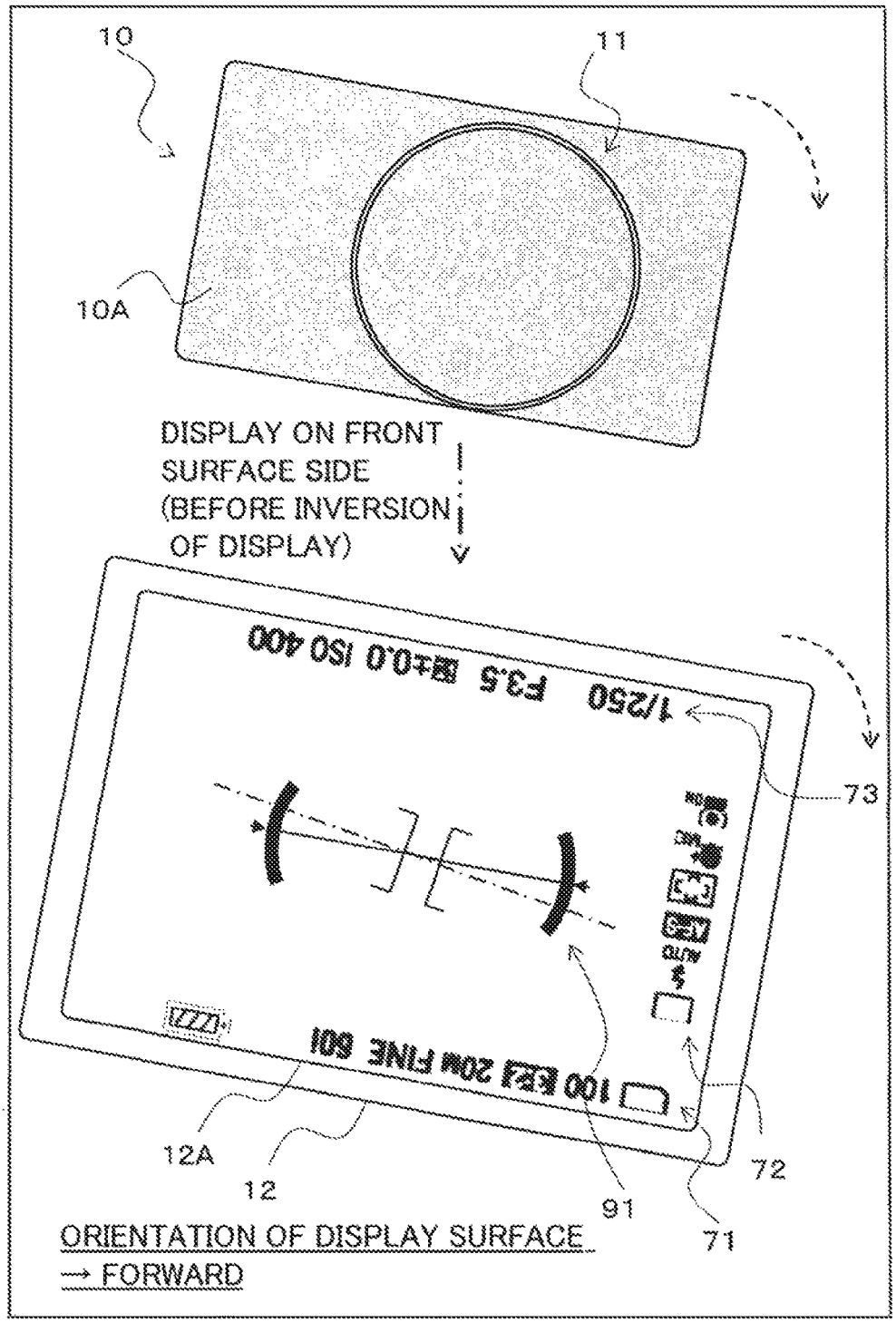

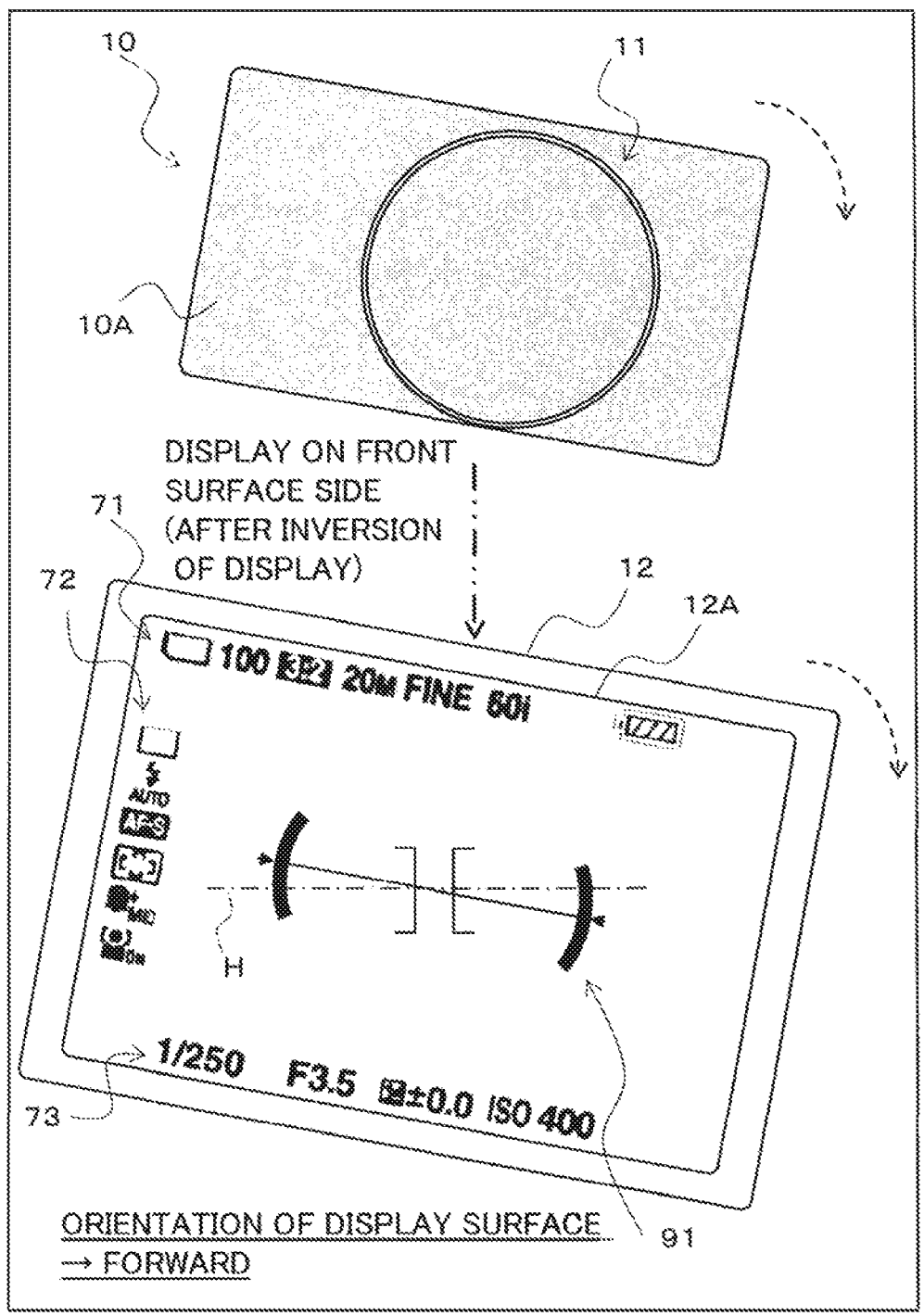

IMAGING UNIT TO CONTROL DISPLAY STATE OF SHOOTING INFORMATION

CROSS REFERENCE TO RELATED APPLICATIONS

This application is a U.S. National Phase of International Patent Application No. PCT/JP2015/001226 filed on Mar. 6, 2015, which claims priority benefit of Japanese Patent Application No. JP 2014-097049 filed in the Japan Patent Office on May 8, 2014 and also claims priority benefit of Japanese Patent Application No. JP 2014-100395 filed in the Japan Patent Office on May 14, 2014. Each of the above-referenced applications is hereby incorporated herein by reference in its entirety.

TECHNICAL FIELD

The present disclosure relates to an imaging unit that is suitable for a compact digital still camera (DSC), etc.

BACKGROUND ART

Taking into consideration reduction in size of an imaging unit in a case of carrying the imaging unit, there has been proposed an imaging unit in which a viewfinder is foldable along a body or is allowed to be contained inside the body (for example, see PTL 1 or PTL 2). The imaging unit is so configured that a user (photographer) pulls out the viewfinder to use the viewfinder.

CITATION LIST

Patent Literature

[PTL 1]
JP S60-121431
[PTL 2]
JP 2001-268402

SUMMARY

Technical Problem

There has been known an imaging unit that is provided with a display panel separately from a viewfinder. The display panel may display information related to shooting in an icon-like form or may display a so-called live-view image, a shot image, etc. In some of such imaging units, the display panel is provided on a body to be pivotable on an axis on the body. For example, there has been known an imaging unit in which a state of the display panel is allowed to be varied, with respect to the body, between a first pivoting state in which a display surface is oriented backward of the body and a second pivoting state in which the display surface is oriented forward of the body.

In such an imaging unit, for example, by achieving the second pivoting state in which the display surface of the display panel is oriented forward, it is possible to easily shoot a so-called "selfie", that is, to direct an imaging lens toward the photographer oneself to shoot the photographer oneself. Also, in some of the imaging units in recent years, an electronic levelness indicator is displayed on the display panel, which allows an inclination of the unit body to be recognized. In a case where a direction of the display panel is allowed to be varied in various forms, it is desirable to appropriately switch a display state of icons, the electronic levelness indicator, etc. that are displayed on the display section, depending on shooting circumstances.

It is desirable to provide an imaging unit that achieves appropriate information display depending on the shooting circumstances.

Solution to Problem

According to an embodiment of the present disclosure, there is provided an imaging unit, including: a body; a display section provided on the body and pivotable on an axis on the body between a first state in which a display surface is oriented backward of the body and a second state in which the display surface is oriented forward of the body; and a display control section configured, when the display section is in the second state, to cause the display section to display a levelness indicator that indicates an inclination of the body, and to cause the display section to display predetermined shooting information inversely in top-bottom and left-right directions with respect to display directions of the predetermined shooting information on the display section in the first state.

In the imaging unit of the embodiment of the present disclosure, the display state of the levelness indicator and the display state of the predetermined shooting information other than the levelness indicator are appropriately controlled depending on the state of the display section.

Advantageous Effects of Invention

According to the imaging unit of the embodiment of the present disclosure, the display state of the levelness indicator and the display state of the predetermined shooting information other than the levelness indicator are appropriately controlled depending on the state of the display section. Accordingly, it is possible to achieve appropriate information display depending on the shooting circumstances.

It is to be noted that the effects of the present technology are not necessarily limited to the effects described above and may be any of the effects described in the present disclosure.

It is to be understood that both the foregoing general description and the following detailed description are exemplary, and are intended to provide further explanation of the technology as claimed.

BRIEF DESCRIPTION OF DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 1 is a perspective view illustrating a configuration of an imaging unit according to an embodiment of the present disclosure in a front view.

FIG. 2 is a perspective view illustrating the configuration of the imaging unit illustrated in FIG. 1 in a rear view.

FIG. 3 is a front view for describing an arrangement of a viewfinder inside a body in a containing position illustrated in FIG. 1.

FIG. 4 is a perspective view illustrating a state in which the viewfinder is caused to protrude from the containing position to an upper side of the body in the imaging unit illustrated in FIG. 1.

FIG. 5 is a perspective view illustrating a configuration of the imaging unit illustrated in FIG. 4 in a rear view.

FIG. 6 is a perspective view illustrating a state in which the viewfinder is caused to move backward of the body to be in a use position in the imaging unit illustrated in FIG. 4.

FIG. 7 is a perspective view illustrating a configuration of the imaging unit illustrated in FIG. 6 in a rear view.

FIG. 8 is a perspective view illustrating an example of a second state of a display section.

FIG. 9 is a front view illustrating an example of the second state of the display section.

FIG. 10 is an explanatory diagram illustrating details of a control wheel.

FIG. 11 is an explanatory diagram illustrating an example of a form of a posture position of the body.

FIG. 12 is a block diagram illustrating a configuration example of a control system circuit.

FIG. 13 is an explanatory diagram illustrating an example of icons, etc. that are displayed on the display section.

FIG. 14 is a front view illustrating an example of a display area in a case where the display section is in the second state and the viewfinder protrudes to the upper side.

FIG. 15 is an explanatory diagram illustrating a display example of icons in a case where the display section is in the second state and the viewfinder protrudes to the upper side.

FIG. 16 is an explanatory diagram illustrating an example of arch-like menu display that is displayed when the control ring is operated.

FIG. 17 is an explanatory diagram illustrating an example of a correspondence relationship between an operation direction of the control ring and a variation direction of the arch-like menu display in a case where the display surface is oriented forward (the display section is in a first state).

FIG. 18 is an explanatory diagram illustrating an example of the correspondence relationship between the operation direction of the control ring and the variation direction of the arch-like menu display in a case where the display surface is oriented forward (the display section is in the second state).

FIG. 19 is an explanatory diagram illustrating an example of an electronic levelness indicator.

FIG. 20 is an explanatory diagram illustrating a display example of the electronic levelness indicator in a case where the body is inclined.

FIG. 21 is an explanatory diagram illustrating a display example of the electronic levelness indicator and other icons in the case where the display surface is oriented backward (the display section is in the first state).

FIG. 22 is an explanatory diagram illustrating a display example (before display inversion) of the electronic levelness indicator and other icons in the case where the display surface is oriented forward (the display section is in the second state).

FIG. 23 is an explanatory diagram illustrating a display example (after the display inversion) of the electronic levelness indicator and other icons in the case where the display surface is oriented forward (the display section is in the second state).

DESCRIPTION OF EMBODIMENTS

Some embodiments of the present disclosure are described below in detail with reference to the drawings. The description is provided in the following order.

1. Configuration 1-1. General Configuration Example of Imaging Unit (FIGS. 1 to 11)
1.2 Configuration Example of Control System (FIGS. 12 and 13)

2. Operation 2.1 Basic Operation Example of Imaging Unit
2.2 Display Examples of Display Section (FIGS. 14 to 23)

3. Effects

4. Other Embodiments

1. First Embodiment 1-1. General Configuration Example of Imaging Unit

FIG. 1 illustrates a configuration of an imaging unit 1 according to an embodiment of the present disclosure in a front view. FIG. 2 illustrates the configuration of the imaging unit 1 in a rear view. The imaging unit 1 may be a compact digital single-lens camera, for example, and may include a body 10 and a viewfinder 20. As illustrated in FIG. 3, the viewfinder 20 may be contained in a containing position P1 inside the body 10 when the viewfinder 20 is not in use, and may be configured to protrude (pop up) to a use position P2 outside the body 10 when the viewfinder 20 is in use.

The body 10 may have an almost-rectangular-parallelepiped shape that is longer in a horizontal direction, and may include a front surface 10A, a rear surface 10B, a top surface 10C, and a side surface 10D, for example. The front surface 10A of the body 10 may be provided with a body mount 11. Moreover, an imaging device 112, various control system circuits such as a signal processing section 102, and the like illustrated in FIG. 12 described later may be contained inside the body 10. The side surface 10D of the body 10 may be provided with a viewfinder operation section 10E for causing the viewfinder 20 to pop up.

The top surface 10C of the body 10 may be provided with a power source button 15 and a shutter button 16. The rear surface 10B of the body 10 is provided with a display section 12. Also, a plurality of operation buttons 17 and a control wheel 18 may be provided on the rear surface 10B of the body 10. The control wheel 18 may be one of direction selection sections that each allow a display matter on the display section 12 to be selected by an operation direction of the control wheel 18. As illustrated in FIG. 10, the control wheel 18 may have a function as operation buttons 18A in top, bottom, left, and right directions, for example. Alternatively, the control wheel 18 may be one of ring-like operation sections that each have an operation direction that is allowed to be varied in a clockwise direction and a counterclockwise direction. For example, a display matter such as predetermined shooting information to be displayed on the display section 12 may be allowed to be selected by the operation direction of the control wheel 18.

Further, the rear surface 10B of the body 10 may be provided with an eye sensor 60 near the viewfinder 20. The eye sensor 60 may be configured to sense, for example, with the use of a magnetic sensor, whether or not a user (photographer) is looking into the viewfinder 20.

It is to be noted that, in FIGS. 1 and 2, "forward" of the body 10 is assumed to be on the front surface side of the body 10, and to be on the lens side or on the subject side in a front-back direction Z of the body 10. "Backward" of the body 10 is assumed to be on the rear surface side of the body 10. It is to be noted that the front-back direction Z may be the same as a direction of an optical axis of an imaging lens 111 illustrated in FIG. 12 described later that is attached to the body 10. Further, a left-right direction of the body 10 is assumed to be an X direction, and a top-bottom direction of the body 10 is assumed to be a Y direction. The same is applicable to other drawings referred to below.

The body mount 11 is configured to mechanically or electrically connect the body 10 to the interchangeable imaging lens 111 illustrated in FIG. 12 described later. The user is allowed to select the interchangeable imaging lens 111 depending on application and to connect the selected imaging lens 111 to the body 10. It is to be noted that FIG. 1 illustrates a state in which the body mount 11 is covered with a cap 11A.

Also, the body mount 11 may be provided with a control ring 19. The control ring 19 may be one of the direction selection sections that each allow the display matter on the display section 12 to be selected by an operation direction of the control ring 19. The control ring 19 may be one of the ring-like operation sections that each have an operation direction that is allowed to be varied in the clockwise direction and the counterclockwise direction. For example, the display matter such as predetermined shooting information to be displayed on the display section 12 may be allowed to be selected by the operation direction of the control ring 19.

The viewfinder 20 may be provided for visually confirming an image to be shot to perform composition setting, focusing, etc. The viewfinder 20 may be configured of an OVF (optical viewfinder) or an EVF (electronic viewfinder). For example, in a case where the viewfinder 20 is configured of the electronic viewfinder, an eyepiece (not illustrated) and a display screen (not illustrated) may be provided behind a viewing window 21 (not illustrated in FIGS. 1 to 3, see FIG. 7). The display screen may be configured of liquid crystal, organic EL (Electro Luminescence), or the like, for example.

Moreover, the viewfinder 20 may be movable in two or more directions between the containing position P1 at which the viewfinder 20 is contained inside the body 10 and the use position P2 at which the viewfinder 20 protrudes outside the body 10. This allows reduction in size of the imaging unit 1.

The viewfinder 20 may be preferably movable in two directions that are orthogonal to each other. Specifically, it may be preferable that the viewfinder 20 stretch out (protrude) from the containing position P1 (see FIGS. 1 to 3) to the upper side of the body 10 as illustrated by an arrow A1 in FIGS. 4 and 5, and then move backward of the body 10 (in an eyepiece direction) as illustrated by an arrow A2 in FIGS. 6 and 7 to arrive at the use position P2. By causing the viewfinder 20 to protrude to the upper side of the body 10, the use position P2 is positioned on the upper side of the body 10. Accordingly, the imaging unit 1 is allowed to have a configuration closer to a configuration of a general digital single-lens camera in which the viewfinder 20 is positioned on the upper side of a lens barrel, the display section 12, etc., which makes it possible to improve usability for the user. Also, by causing the viewfinder 20 to move backward of the body 10, it is possible to reduce a clearance to an eye, and to thereby improve light blocking characteristics.

Concerning an amount by which the viewfinder 20 moves backward of the body 10, an eyepiece surface 22A of the viewfinder 20 may preferably protrude more to the back compared to the rear surface 10B (the display section 12) of the body 10, for example. Accordingly, the clearance to an eye is reduced, and a nose of the user may be less likely to hit the display section 12, which improves usability.

The body 10 may preferably have, on the top surface 10C, an opening section 13 at which the viewfinder 20 comes out and goes in the body 10. This makes it possible to provide the opening section 13 at which the viewfinder 20 comes out and goes in the body 10 to be provided in a portion other than the rear surface 10B of the body 10, which makes it easier to increase the size of the lens barrel or to increase the size of the screen of the display section 12. Incidentally, in the case of providing the opening section 13 on the rear surface 10B of the body 10, the size of the body 10 may be increased. Alternatively, when the size of the body 10 is kept unchanged, the lens barrel is made smaller, which causes decrease in magnification, brightness, and size of the imaging device. Also, the size of the display section 12 is reduced.

It is to be noted that the position of the opening section 13 illustrated in FIGS. 1 to 3 is a place where an electronic flash is arranged in a general digital single-lens camera. In the present embodiment, an arrangement of an electronic flash 14 is varied, and the electronic flash 14 is arranged at a position closer to the middle compared to the opening section 13.

The viewfinder 20 may be preferably arranged to avoid the body mount 11 as illustrated in FIG. 3 described above. This makes it possible to avoid interference between the viewfinder 20 and the lens barrel. It is to be noted that the viewfinder 20 may overlap the display section 12 in the rear view.

The viewfinder 20 may be provided with a diopter adjustment section 26 (see FIGS. 6 and 7). The diopter adjustment section 26 is an operation section (such as a lever, a knob, or a dial) for adjusting diopter power of the viewfinder 20 depending on eyesight of the user. The diopter adjustment section 26 may be preferably provided on the top surface of a viewfinder unit configuring the viewfinder 20. Further, the diopter adjustment section 26 may be preferably hidden inside the body 10 at the containing position P1 (see FIGS. 1 to 3), and may be preferably exposed at the use position P2 to be operable (see FIGS. 6 and 7). By thus limiting accessibility to the diopter adjustment section 26, it is possible to prevent the diopter adjustment section 26 to be operated unintentionally, and to thereby prevent unintentional change in setting. Also, an amount by which the diopter adjustment section 26 protrudes from the top surface of the viewfinder unit is reduced, which makes it less likely for the setting to be reset even when the viewfinder 20 is caused to be placed again at the containing position P1 from the use position P2. Accordingly, it is possible to eliminate troublesome re-adjustment of the diopter adjustment section 26 for every use, and to thereby improve convenience for the user.

The display section 12 may be configured of a liquid crystal panel, for example. The display section 12 may be allowed to display various pieces of predetermined shooting information related to shooting. The predetermined shooting information may be a live-view image of a subject 2, an icon-like display, etc. as those illustrated in FIG. 13 described later. Also, the display section 12 may display various menu displays related to the setting of the unit, an electronic levelness indicator 91 illustrated in FIG. 19, etc. described later, and/or the like.

As illustrated in FIGS. 8 and 9, the display section 12 is configured to be pivotable on an axis on the body 10 between a first state in which the display surface 12A is oriented backward of the body 10 and a second state in which the display surface 12A is oriented frontward of the body 10. As illustrated in FIG. 8, the display section 12 may be pivotable by 180 degrees on one side on the upper portion of the body 10, for example.

By causing the display section 12 to be in the second state, it is possible to easily shoot a so-called "selfie", that is to direct the imaging lens 111 (FIG. 12) toward the photographer oneself to shoot the photographer oneself. It is possible for the photographer to perform shooting while confirming a through view of the subject 2 including the photographer oneself on the display section 12.

It is to be noted that, in the imaging unit 1, in the case of shooting a selfie, etc., it is possible to appropriately select, depending on the preference of the photographer, one of shooting in which the body 10 is brought into a horizontal posture position as illustrated in an upper part of FIG. 11, and shooting in which the body 10 is brought into a vertical posture position as illustrated in a lower part of FIG. 11.

1.2 Configuration Example of Control System

FIG. 12 illustrates a configuration example of a control system circuit of the imaging unit 1.

The imaging unit 1 may include a control section 101, a signal processing section 102, a display control section 103, an image recording section 104, an operation section 105, and a sensing section 106, as the control system circuit. The imaging unit 1 may further include an imaging section 110 and a lens driving section 113. The imaging section 110 may include the imaging lens 111 and the imaging device 112. The sensing section 106 may include the eye sensor 60, a display section pivoting sensing section 107, and a posture sensing section 108.

The imaging lens 111 is configured to form an optical image of a subject on the imaging device 112. The imaging lens 111 may include a plurality of lenses. It is possible to perform adjustment of optical zooming magnification, focusing, etc. by causing the lenses to travel. The imaging device 112 is configured to form the subject image on a light receiving surface through the imaging lens 111 and to generate an electric signal by photoelectric conversion. The imaging device 112 may be configured of a CMOS (Complementary Metal Oxide Semiconductor) image sensor, for example. The lens driving section 113 is configured to drive the lenses in the imaging lens 111 for adjusting the optical zooming magnification, an F-number, focusing, etc.

The signal processing section 102 is configured to perform various signal processes on an imaging signal outputted from the imaging device 112, and to thereby generate image data to be displayed on the viewfinder 20 and the display section 12, image data to be recorded by the image recording section 104, and the like.

The image recording section 104 is configured to record the image data in a recording medium inside or outside the body which is not illustrated.

The operation section 105 may include the power source button 15, the shutter button 16, the operation buttons 17, the control wheel 18, the operation buttons 18A, and the control ring 19 illustrated in FIGS. 1 to 10 described above.

The control section 101 is configured to perform overall control of the respective sections in the imaging unit 1. The control section 101 has a function as an imaging control section that performs control depending on a shooting mode. An example of the shooting mode may be a self-timer mode in which an actual imaging process is executed after predetermined time has elapsed since an instruction for starting imaging is made.

The display control section 103 is configured to perform display control with respect to the viewfinder 20 and the display section 12. The display control section 103 may perform display control of various pieces of shooting information related to shooting that are displayed on the viewfinder 20 and the display section 12, for example. For example, the display control section 103 may perform control of displaying a live-view image of the subject 2, an icon-like display, etc. as those illustrated in FIG. 13. Also, the display control section 103 may perform display control of various menu displays related to the setting of the unit, the electronic levelness indicator 91 illustrated in FIG. 19, etc. described later, and/or the like. The display control section 103 may execute display control for displaying letters, images, and other various pieces of information on the display section 12 based on the control by the control section 101. The display section 12 displays the letters, the images, and other various pieces of information, display of which is controlled by the display control section 103.

In this example, FIG. 13 illustrates an example in which an icon group 71, an icon group 72, an icon group 73, a self-timer icon 80, and a live-view image of the subject 2 are displayed on the display section 12. As the self-timer icon 80, a shooting mode icon 81 and a countdown icon 82 may be provided. The shooting mode icon 81 represents that the shooting mode is set to the self-timer mode. The countdown icon 82 represents passage of time in the self-timer mode. The countdown icon 82 may display the passage of time in a countdown scheme on a second unit basis, for example.

The display section pivoting sensing section 107 may include a sensor for detecting a state of the display section 12. The display section pivoting sensing section 107 is at least configured to detect whether the display section 12 is in the first state (in which the display surface 12A is oriented backward) or the second state (in which the display surface 12A is oriented forward).

The posture sensing section 108 may include a sensor for detecting a posture of the body 10 of the imaging unit 1. Examples of the sensor for detecting the posture of the body 10 may include an acceleration sensor and a gyro sensor. Alternatively, an angle of the body 10 may be detected with the use of an angle sensor, a so-called vertical-horizontal sensor, or the like, for example. The posture sensing section 108 is at least configured to detect whether the body 10 is in the horizontal posture position or in the vertical posture position. The posture sensing section 108 is also configured to detect a horizontal position (horizontal line H) in the case where the electronic levelness indicator 91 illustrated in FIG. 19, etc. is used.

2. Operation

2.1 Basic Operation Example of Imaging Unit

The imaging unit 1 may operate as follows, for example.

In the imaging unit 1, it is possible to perform shooting while confirming the composition of the subject 2 with the use of the viewfinder 20 or the display section 12. The power source of the imaging unit 1 is allowed to be turned on and off by the operation of the power source button 15. Further, in the case where the viewfinder 20 is used in particular, the power source may be turned on and off automatically in accordance with the popping up operation of the viewfinder 20.

In this example, the viewfinder 20 is contained at the containing position P1 inside the body 10 when the viewfinder 20 is not in use (see FIGS. 1 to 3). When the viewfinder 20 is used, the user slides the viewfinder operation section 10E on the side surface 10D of the body 10, and the viewfinder unit configuring the viewfinder 20 thereby pops up outside the body 10 (see FIGS. 4 and 5). At the use position P2 of the viewfinder 20, the diopter adjustment section 26 is exposed to be operable.

In the imaging unit 1, the viewfinder 20 is configured to be movable in two or more directions between the containing position P1 at which the viewfinder 20 is contained inside the body 10 and the use position P2 at which the viewfinder 20 protrudes outside the body 10. Accordingly, it is possible to provide the opening section 13 at which the viewfinder 20 goes out and comes in the body 10 in a portion other than the rear surface 10B of the body 10. This makes it possible to reduce the size of the body 10 while causing the imaging unit 1 to be suitable for increase in size of the lens barrel, increase in size of the screen of the display section 12, etc.

2.2 Display Example of Display Section

Next, for example, a display example on the display section 12 suitable for shooting a selfie is described. In the case where the display section 12 is in the second state (in which the display surface 12A is oriented forward), the display control section 103 may cause the display state of the display section 12 to be varied depending on the contained state of the viewfinder 20.

It is to be noted that, in the description below, a state in which the viewfinder 20 protrudes to the upper side may be a state in which the viewfinder 20 protrudes only to the upper side of the body 10 (in the direction illustrated by the arrow A1 in FIGS. 4 and 5), or may be a state in which the eyepiece surface 22A is further moved backward of the body 10 (in the direction illustrated by the arrow A2 in FIGS. 6 and 7) from that state.

FIG. 14 illustrates an example of a display area in a case where the display section 12 is in the second state and the viewfinder 20 protrudes to the upper side. In the case where the display section 12 is in the second state and the viewfinder 20 protrudes to the upper side of the body 10, the display control section 103 may cause a region other than a portion in which the viewfinder 20 overlaps the display section 12 in the front view to be a display area 12B, as illustrated in FIG. 14. The live-view image of the subject 2, the icons, etc. may be displayed on the display area 12B.

FIG. 15 illustrates a display example of icons in the case where the display section 12 is in the second state and the viewfinder 20 is stretched to the upper side. As illustrated in a lower part of FIG. 15, the display control section 103 may display a plurality of icons in a region other than a portion in which the viewfinder 20 overlaps the display section 12 in a front view in the case where the display section 12 is in the second state and the viewfinder 20 protrudes to the upper side of the body 10. For example, the display positions of the self-timer icon 80 and the icon group 73 may be moved so that the self-timer icon 80 and the icon group 73 do not overlap the viewfinder 20 in the front view, from the display state illustrated in an upper part of FIG. 15 to the display state illustrated in the lower part of FIG. 15.

Display Example of Arch-Like Menu Display

The display control section 103 may cause the display matter on the display section 12 to be varied depending on the instruction from the operation section 105, and may also cause a correspondence relationship between the display matter and a state of the instruction from the operation section 105 to be varied between the first state and the second state of the display section 12.

In a case where the operation section 105 is a plurality of operation buttons that allow the display matter on the display section 12 to be selected by positions of the buttons, the display control section 103 may cause the display matter on the display section 12 to be varied depending on the operation of the plurality of operation buttons. Also, the display control section 103 may cause a correspondence relationship between the display matter on the display section 12 and the operation buttons to be varied between the first state and the second state of the display section 12.

In a case where the operation section 105 is a direction selection section that allows the display matter on the display section 12 to be selected by an operation direction thereof, the display control section 103 may cause the display matter on the display section 12 to be varied depending on the operation direction. Also, the display control section 103 may cause a correspondence relationship between the display matter and the operation direction of the direction selection section to be varied between the first state and the second state of the display section 12.

Referring to FIGS. 16 to 18, description is provided of a display example in a case where the direction selection section is a ring-like operation section having an operation direction that is allowed to be varied in a clockwise direction and a counterclockwise direction.

FIG. 16 illustrates an example of arch-like menu display that is displayed when the control ring 19 is operated. The display control section 103 may perform, for example, arch-like menu display as illustrated in FIG. 16 when the control ring 19 is operated. The display example illustrated in FIG. 16 shows an example in which numerical values of −3, −2, −1, 0, 1, 2, and so on are simply displayed as the arch-like menu display 92. However, information related to the F-number, the zooming magnification, etc. may be displayed in an arch-like form instead of the numerical values. Also, various menu icons may be displayed. A content of a function assigned to the control ring 19 may be changed by another operation section 105. Further, for example, in a case where zooming magnification is assigned to the control ring 19, zooming with the use of the imaging lens 111 may be achieved by allowing the lens driving section 113 to operate in accordance with the operation of the control ring 19.

FIG. 17 illustrates an example of a correspondence relationship between the operation direction of the control ring 19 and the variation direction of the arch-like menu display 92 in the case where the display surface 12A is oriented backward (the display section 12 is in the first state). The display matter on the arch-like menu display 92 is varied in response to the operation of the control ring 19. In the example illustrated in FIG. 17, the control ring 19 is operated in the clockwise direction in the front view (in the counterclockwise direction in the rear view). In this case, the display control section 103 may cause the display matter of the arch-like menu display 92 to be varied in the counterclockwise direction, for example.

FIG. 18 illustrates an example of the correspondence relationship between the operation direction of the control ring 19 and the variation direction of the arch-like menu display 92 in the case where the display surface 12A is oriented forward (the display section 12 is in the second state). In the example illustrated in FIG. 18, the control ring 19 is operated in the clockwise direction in the front view (in the counterclockwise direction in the rear view), as in the example illustrated in FIG. 17. However, the display surface 12A is oriented forward in the example illustrated in FIG. 18. The display control section 103 may therefore cause the display matter of the arch-like menu display 92 in the clockwise direction, which is an opposite direction from that in the example illustrated in FIG. 17, for example.

It is to be noted that, although the case where the direction selection section is the control ring 19 has been described as an example above, similar display control may be performed for other operation section 105 such as the control wheel 18. Moreover, although the case where the menu display is in an arch-like form has been described as an example above, the display form is not limited to the arch-like form.

Display Example of Electronic Levelness Indicator

FIG. 19 illustrates a display example of the electronic levelness indicator 91. FIG. 20 illustrates a display example of the electronic levelness indicator 91 in a case where the body 10 is inclined compared to the display example illustrated in FIG. 19. As illustrated in FIGS. 19 and 20, the display control section 103 displays, on the display section 12, the electronic levelness indicator 91 by which the inclination of the body 10 with respect to the horizontal line H is allowed to be recognized.

In this example, the display control section 103 displays the electronic levelness indicator 91 so that the inclination of the body 10 is allowed to be recognized in both the first state and the second state of the display section 12. Also, the display control section 103 causes the display of the predetermined shooting information (such as icon displays) other than the electronic levelness indicator 91 to be displayed inversely in top-bottom and left-right directions between the first state and the second state of the display section 12.

FIG. 21 illustrates a display example of the electronic levelness indicator 91 and other icons in the case where the display surface 12A is oriented backward (the display section 12 is in the first state). On the other hand, FIG. 22 illustrates a display example (before display inversion) of the electronic levelness indicator 91 and other icons in the case where the display surface 12A is oriented forward (the display section 12 is in the second state). FIG. 23 illustrates a display example (after the display inversion) of the electronic levelness indicator 91 and other icons in the case where the display surface 12A is oriented forward (the display section 12 is in the second state).

In a case where the state is varied from the display state illustrated in FIG. 21 to the state in which the display section 12 is in the second state, if the display state is unchanged, the electronic levelness indicator 91 and the icon groups 71 to 73 are displayed in a manner inverted in the top-bottom and left-right directions as illustrated in FIG. 22 in a front view. For this reason, the display control section 103 causes the display of the icon groups 71 to 73 to be inverted in the top-bottom and left-right directions so that the display of the icon groups 71 to 73 are allowed to be seen properly in the front view as illustrated in FIG. 23. However, concerning the electronic levelness indicator 91, if the display of the electronic levelness indicator 91 is simply inverted in the top-bottom and left-right directions, the inclination of the body 10 is not allowed to be shown properly. Accordingly, the display control section 103 does not cause the display of the electronic levelness indicator 91 to be simply inverted in the top-bottom and left-right directions, but makes an adjustment to display the electronic levelness indicator 91 so that the inclination of the body 10 is allowed to be recognized properly.

3. Effects

According to the present embodiment, the display state of the electronic levelness indicator 91 and the display state of the predetermined shooting information other than the electronic levelness indicator 91 are controlled appropriately depending on the state of the display section 12, and it is therefore possible to achieve appropriate information display depending on the shooting circumstances.

It is to be noted that the effects described herein are mere examples and the effects of the present technology are not limited thereto. Also, the effects of the present technology may include other effect.

4. Other Embodiments

The technology according to the present disclosure is not limited to the description of the embodiment above, and various modifications thereof may be made.

For example, it is possible to achieve at least the following configurations from the above-described example embodiment and the modifications of the disclosure.

(1)
An imaging unit, including:
a body;
a display section provided on the body and pivotable on an axis on the body between a first state in which a display surface is oriented backward of the body and a second state in which the display surface is oriented forward of the body; and
a display control section configured, when the display section is in the second state, to cause the display section to display a levelness indicator that indicates an inclination of the body, and to cause the display section to display predetermined shooting information inversely in top-bottom and left-right directions with respect to display directions of the predetermined shooting information on the display section in the first state.

(2)
The imaging unit according to (1), further including
an operation section operable to provide an instruction of the predetermined shooting information, wherein
the display control section causes display matter displayed on the display section to be varied depending on the instruction from the operation section, and causes a correspondence relationship to be switched between in the first state and in the second state, the correspondence relationship being a relationship between the instruction from the operation section and a display mode in which the display matter is displayed.

(3)
The imaging unit according to (2), wherein
the operation section includes a direction selector, and
the display control section causes the display matter displayed on the display section to be varied depending on a direction of operation performed on the direction selector, and causes a correspondence relationship to be switched between in the first state and in the second state, the correspondence relationship being a relationship between the direction of operation and the display mode in which the display matter is displayed.

(4)
The imaging unit according to (3), wherein the direction selector includes a ring-like operation section that is operable both in a clockwise direction and in a counterclockwise direction, the clockwise direction and the counterclockwise direction being switchable to each other.

(5)
The imaging unit according to any one of (2) to (4), wherein
the operation section includes a plurality of operation buttons, and
the display control section causes the display matter displayed on the display section to be varied depending on a position of an operation performed on the operation buttons, and causes a correspondence relationship to be switched between in the first state and in the second state, the correspondence relationship being a relationship between the position of the operation performed on the operation buttons and the display mode in which the display matter is displayed.

(6)
The imaging unit according to any one of (1) to (5), wherein displaying the predetermined shooting information includes displaying a live-view image of a subject.

(7)
The imaging unit according to any one of (1) to (6), wherein displaying the predetermined shooting information includes displaying an icon-like object.

(8)
The imaging unit according to any one of (1) to (7), further including
a viewfinder contained inside the body and operable to pop up from the body when in use, wherein
the display control section causes the display section to switch a display mode depending on whether the viewfinder is contained or not, when the display section is in the second state.

(9)
The imaging unit according to (8), wherein the display control section causes the predetermined shooting information to be displayed in a specific region of the display section when the display section is in the second state and the viewfinder is in a popped-up state, the specific region being a region other than a overlapped region in which the viewfinder overlaps the display section in a front view.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST

1 Imaging unit
2 Subject
10 Body
10A Front surface
10B Rear surface
10C Top surface
10D Side surface
10E Viewfinder operation section
11 Body mount
11A Cap
12 Display section
12A Display surface
12B Display area
13 Opening section
14 Electronic flash
15 Power source button
16 Shutter button
17 Operation button
18 Control wheel (Direction selection section, Ring-like operation section, Operation button)
18A Operation button
19 Control ring (Direction selection section, Ring-like operation section)
20 Viewfinder
21 Viewing window
22A Eyepiece surface
26 Diopter adjustment section
60 Eye sensor
71 Icon group
72 Icon group
73 Icon group
80 Self-timer icon
81 Shooting mode icon
82 Countdown icon
91 Electronic levelness indicator
92 Arch-like menu display
101 Control section
102 Signal processing section
103 Display control section
104 Image recording section
105 Operation section
106 Sensing section
107 Display section pivoting sensing section
108 Posture sensing section
110 Imaging section
111 Imaging lens
112 Imaging device
113 Lens driving section
H Horizontal line
P1 Containing position
P2 Use position

The invention claimed is:

1. An imaging apparatus, comprising:
a body;
a display panel on the body, the display panel configured to:
   pivot on an axis of the body between a first state and a second state, wherein a display surface of the display panel is oriented towards a back side of the body in the first state, and the display surface is oriented towards a front side of the body in the second state, wherein the front side is a subject side of the body, and the front side is opposite to the back side in an optical axis direction;
a direction selector configured to operate both in a clockwise direction and in a counterclockwise direction; and
circuitry configured to:
   control the display panel to display a levelness indicator that indicates an inclination of the body based on the display panel that is in the first state,
   control the display panel to display the levelness indicator inversely based on a change of the first state to the second state,
   control the display panel to display a menu that is varied based on the operation of the direction selector,
   wherein the variation of the menu is in a first direction based on the display panel that is in the first state, and the variation of the menu is in a second direction different from the first direction based on the display panel that is in the second state.

2. The imaging apparatus according to claim 1, further comprising a plurality of operation buttons, wherein the circuitry is further configured to:
control the display panel to vary display information displayed on the display panel, based on an operation of an operation button of the plurality of operation buttons, and
switch a first correspondence relationship, wherein the first correspondence relationship is a relationship between the operation of the operation button and a display mode in which the display information is displayed, and wherein the first correspondence relationship is switched between the first state and the second state.

3. The imaging apparatus according to claim 1, wherein the direction selector is at least one of a control ring or a control wheel.

4. The imaging apparatus according to claim 2, wherein the circuitry is further configured to control the display panel to vary the display information based on a position of the operation of the operation button, and
switch a second correspondence relationship, wherein the second correspondence relationship is a relationship between the position of the operation and the display mode in which the display information is displayed, and wherein the second correspondence relationship is switched between the first state and the second state.

5. The imaging apparatus according to claim 1, further comprising
a viewfinder in the body, the viewfinder is configured to pop up from the body when in use, wherein the circuitry is further configured to cause the display panel to switch a display mode based on whether the viewfinder is contained in the body and based on the display panel that is in the second state.

6. The imaging apparatus according to claim 5, wherein the circuitry is further configured to control the display panel to display shooting information in a first region of the display panel, based on the display panel that is in the second state and based on the viewfinder that is popped-up from the body, wherein the first region is different from a second region of the display panel, and wherein the second region is a region on which the viewfinder overlaps the display surface in a view from the subject side.

7. The imaging apparatus according to claim 1, wherein the circuitry is further configured to control the display panel to:
display shooting information based on the display panel that is in the first state, and
display the shooting information inversely in a top-bottom display direction and a left-right display direction with respect to display directions of the shooting information, based on the change of the first state to the second state.

8. The imaging apparatus according to claim 7, wherein the shooting information comprises a live-view image of a subject.

9. The imaging apparatus according to claim 7, wherein the shooting information comprises an icon-like object.

10. The imaging apparatus according to claim 5, wherein the viewfinder is further configured to move in a direction towards the back side of the body.

11. The imaging apparatus according to claim 1, further comprising an eye sensor configured to detect a gaze of a user.

12. The imaging apparatus according to claim 1, wherein the menu is an arch-like menu.

13. A camera, comprising:
a body;
a viewfinder in the body, wherein the viewfinder is positioned outside the body when in use;
a display panel on the body, the display panel configured to:
pivot on an axis of the body between a first state and a second state, wherein a display surface of the display panel is oriented towards a back side of the body in the first state, and the display surface is oriented towards a front side of the body in the second state, wherein the front side is a subject side of the body, and the front side is opposite to the back side in an optical axis direction; and
circuitry configured to:
control the display panel to:
display shooting information in a first region of the display panel, based on the display panel that is in the second state and based on the viewfinder that is outside the body,
wherein the first region is different from a second region of the display panel, and wherein the second region is a region on which the viewfinder overlaps the display surface in a view from the subject side.

* * * * *